US006192406B1

United States Patent
Ma et al.

(10) Patent No.: US 6,192,406 B1
(45) Date of Patent: Feb. 20, 2001

(54) STARTUP MANAGEMENT SYSTEM AND METHOD FOR NETWORKS

(75) Inventors: Qingming Ma, Pittsburgh, PA (US); Kadangode K. Ramakrishnan, Berkeley Heights, NJ (US)

(73) Assignee: AT&T Corp., New York, NY (US)

( * ) Notice: Under 35 U.S.C. 154(b), the term of this patent shall be extended for 0 days.

(21) Appl. No.: 08/874,355

(22) Filed: Jun. 13, 1997

(51) Int. Cl.[7] .................................................. G06F 15/173
(52) U.S. Cl. .......................... 709/226; 709/223; 709/224; 709/233; 709/234; 709/225; 709/238; 709/229; 370/229; 370/232; 370/233; 370/234; 370/235
(58) Field of Search ..................................... 709/223, 224, 709/225, 226, 233, 234, 235, 238, 229, 222; 370/229, 231, 232, 233, 234, 235, 236, 237, 238, 409, 412, 413, 429, 254, 351, 216, 241, 230, 94.1, 224; 395/200.56, 200.53, 200.63, 200.64, 200.68, 849, 311

(56) References Cited

U.S. PATENT DOCUMENTS

| | | | |
|---|---|---|---|
| 5,359,593 | * 10/1994 | Derby et al. ........................ | 370/234 |
| 5,379,297 | * 1/1995 | Glover et al. ...................... | 370/234 |
| 5,432,824 | * 7/1995 | Zheng et al. ....................... | 375/356 |
| 5,488,609 | * 1/1996 | Hluchyj et al. ..................... | 370/84 |
| 5,497,375 | * 3/1996 | Hluchyj et al. ..................... | 370/232 |
| 5,515,359 | * 5/1996 | Zheng ................................ | 370/13 |
| 5,528,591 | * 6/1996 | Lauer ................................. | 370/231 |
| 5,675,576 | * 10/1997 | Kalampoukas et al. ............. | 370/232 |
| 5,691,986 | * 11/1997 | Pearlstein .......................... | 370/477 |
| 5,701,291 | * 12/1997 | Roberts ............................. | 370/232 |
| 5,737,313 | * 4/1998 | Kolarov et al. .................... | 370/234 |
| 5,745,477 | * 4/1998 | Zheng et al. ....................... | 370/468 |
| 5,754,530 | * 5/1998 | Awdeh et al. ...................... | 370/232 |
| 5,761,438 | * 6/1998 | Sasaki ............................... | 709/247 |
| 5,777,984 | * 7/1998 | Gun et al. .......................... | 370/230 |
| 5,805,577 | * 9/1998 | Jain et al. .......................... | 370/234 |
| 5,805,599 | * 9/1998 | Mishra et al. ...................... | 370/468 |
| 5,812,526 | * 9/1998 | Chang et al. ....................... | 370/230 |
| 5,812,527 | * 9/1998 | Kline et al. ........................ | 370/232 |
| 5,812,528 | * 9/1998 | VanDervort ........................ | 370/235 |
| 5,864,539 | * 1/1999 | Yin .................................... | 370/236 |
| 5,881,245 | * 3/1999 | Thompson ......................... | 709/219 |
| 5,898,669 | * 4/1999 | Shimony et al. ................... | 370/232 |
| 5,901,138 | * 9/1999 | Bader et al. ....................... | 370/229 |
| 5,926,459 | * 7/1999 | Lyles et al. ........................ | 370/230 |
| 5,940,369 | * 8/1999 | Bhagavath et al. ................. | 370/229 |
| 5,940,375 | * 8/1999 | Soumiya et al. ................... | 370/249 |
| 5,953,336 | * 9/1999 | Moore et al. ...................... | 370/395 |
| 5,987,031 | * 11/1999 | Miller et al. ...................... | 370/412 |
| 5,991,268 | * 11/1999 | Awdeh et al. ...................... | 370/232 |

OTHER PUBLICATIONS

Lampros Kalampoukas et al., An Efficient Rate Allocation Algorithm for Packet–Switched Networks Providing Max–Min Fairness, Feb. 16, 1995.*

(List continued on next page.)

*Primary Examiner*—Mehmet B. Geckil
*Assistant Examiner*—William C. Vaughn, Jr.
(74) *Attorney, Agent, or Firm*—Oliff & Berridge PLC.

(57) ABSTRACT

A startup management system and method, particularly adapted for use in computer and other communication networks, is presented. Rate-based flow and congestion control mechanisms have been considered desirable, including to deal with the needs of emerging multimedia applications. Explicit rate control mechanisms achieve low loss because of a smooth flow of data from sources, while adjusting source rates through feedback. However, large feedback delays, presence of higher priority traffic and varying network conditions make it difficult to ensure feasibility (i.e., the aggregate arrival rate is below the bottleneck resource's capacity) while also maintaining very high resource utilization. The invention applies entry and early warning techniques which increase the initial connect rate of newly connecting sources.

12 Claims, 16 Drawing Sheets

OTHER PUBLICATIONS

Danny Tsang and Wales Wong, A New Rate BAsed Switch Algorithm for ABR Traffic to Achieve Max–Min Fairness with Analytical Approximation and Delay Adjustment, 1996.*

Article: A Hop by Hop Rate–Based Congestion Control Scheme, Partho P. Mishra and Hemant Kanakia p. 112–123.

Article: An Efficient Rate Allocation Algorithm for Packet–Switched Networks Providing Max–Min Fairness, Lampros Kalampoukas, Anujan Varma and K.K. Ramakrishnan, p. 1–25, Feb. 16, 1995.

Article: Erica Switch Algorithm: A Complete Description, Raj Jain, Shiv Kalyanaraman, Rohit Goyal, Sonia Fahmy, and Ram Viswanathan, p. 1–46, Aug. 1996.

* cited by examiner

| FIG. 15B |
|---|
| FIG. 15C |
| FIG. 15D |
| FIG. 15E |

```
Rate Reduction (p: PORT, vc: VC)
1.   cap ← ABR_capacity(p)              /*get total capacity used for ABR VCs*/
                                        /*(returned by Rate Allocation mechanism)*/
2.   q ← queue_size(p)                  /*get queue size of out port (ret'd by Rate
                                        Allocation mechanism)*/
3.   t ← Current_Time()                 /*get the current system time*/
4.   if (q < S) then                    /*if the queue size is smaller than the setpoint*/
5.      if (RTT_clock ≤ 0) then         /*if the clock for an extra maximal RTT is not
                                        started */
6.         RTT_clock ← 1                /*start the extra maximal RTT clock*/
7.      else if ((t−p.maxRTT) > RTT_clock) then  /*if maxRTT after queue being drained*/
8.         vc.Reducing_cap ← 0          /*clear the capacity reduced for vc*/
9.         RTT_clock ← 0                /*stop ticking*/
10.     end if
```

FIG. 15C

```
11.  end if
12.    p.reducing_cap ← 0                              /*capacity being reduced for the port*/
13.    p.reduced_q ← 0                                 /*total queue size reduced so far*/
14.    p.max_queue,p.prev_q ← q                        /*the maximal queue size and the previous queue
                                                         size*/
15.    new_cap ← cap                                   /*use full capacity(ret'd by Rate Allocation
                                                         mechanism*/
16.  else if (bottleneck(vc,p) = 0) then               /*if the VC is not bottlenecked by the port*/
17.    new_cap ← cap - p.reducing_cap                  /*the VC does not contribute to queue build-up*/
18.  else
19.    rm_intval ← t - vc.prev_rm_time                 /*time between this and the previous RM cell*/
20.    v_red_q ← rm_intval · vc.reducing_cap           /*size reduced for virtual queue between two RM
                                                         cells*/
21.    p.reduced_q ← p.reduced_q + v_red_q             /*reduced size of virtual queue by all VCs using
                                                         the port*/
22.    r_red_q ← q - p.prev_q                          /*change of real queue*/
23.    v_q ← p.max_queue - p.reduced_q                 /*update virtual queue size*/
24.    if(r_red_q > v_red_q) and (v_q > q) then        /*if more cells are seen from the real queue*/
25.        p.max_queue ← q                             /*update virtual queue to real queue*/
26.        p.reduced_q ← 0                             /*clear reduced queue size*/
```

FIG. 15D

```
27.  end if
28.  if (v_q ≤ S) then
29.      p.max_queue ← q                                    /*if virtual queue is below set-point*/
30.      p.reduced_q ← 0                                    /*update virtual queue*/
31.  end if                                                 /*clear reduced queue size*/
32.  p.reducing_cap ← Reduction(v-q,cap)                    /*call quadratic reduction function*/
33.  vc.prev_rm_time ← t                                    /*update the previous RM cell time*/
34.  num_b ← p.bottleneck                                   /*get number of bottlenecked VCs (p.bottleneck
                                                             returned by Rate Allocation mechanism)*/
35.  vc.reducing_cap ← p.reducing_cap/num_b                 /*update reducing capacity for the VC*/
36.  p.prev_q ← q                                           /*update the previous queue size*/
37.  new_cap ← cap -p.reducting_cap                         /*update reducing capacity for the vc*/
38.  end if
39.  vc.ER ← MaxMin_FairShare(p,vc,new_cap)                 /*do maxmin fair share rate allocation*/
40.  n ← MAX(1,p.max_RTT/vc.rm_intval)                      /*steps of rate recovery in one maxRTT*/
41.  mininc ← vc.reducing_cap/n                             /*minimum rate to recover in one step*/
42.  maxinc ← MAX_RED/(num_b*n)                             /*maximum rate to recover in one step*/
```

FIG. 15E

```
43. if (mininc > 0) then
44.     max_ER ← vc.prev_ER + mininc                    /*recover the minimum rate over the previous ER*/
45.     else if ((t-p.max RTT) ≤ RTT_clock) then        /*if it is still in max RTT*/
46.         max_ER ← vc.prev_ER + maxinc                /*recover the maximum rate over the previous ER*/
47.     else if (vc.abr_bw > abr_rate) then             /*if the current ABR bandwidth is smaller*/
48.         tmpinc ← (vc.abr_bw/vc.num_b) -             /*difference between the previous and current
                     (abr_bw/num_b)                      VC rates*/
49.         if ((tmpinc ≥ 0)) then
50.             max_ER ← vc.prev_ER + tmpinc            /*recover the difference over the previous ER*/
51.         else
52.             max_ER ← vc.prev_ER + maxinc            /*recover the maximum rate over the previous ER*/
53.     else
54.         tmpinc ← (abr_bw - vc.abr_bw)/num_b         /*per-VC rate increase*/
55.         max_ER ← vc.prev_ER + tmpinc                /*recover the per-VC rate increase over the
                                                          precious ER*/
56.     end if
57.     if (vc.ER > max_ER) then                        /*if allocated rate is larger than allowed
                                                          maximum*/
58.         vc.ER ← max_ER                              /*use the allowed maximual as new ER*/
59.     end if
60.     vc.abr_bw ← abr_bw                              /*update abr bandwidth*/
61.     vc.num_b ← num_b                                /*update the number of bottleneck VCs*/
```

STARTUP MANAGEMENT SYSTEM AND METHOD FOR NETWORKS

FIELD OF THE INVENTION

The invention relates to network management, and more particularly to management of sources which are entering computer and other communication networks.

BACKGROUND OF THE INVENTION

Traffic over current computer and other networks is voluminous, containing many different types and rates of data, and only promises to increase in the future. Future integrated-service networks will support an even wider range of applications with diverse traffic characteristics performance requirements, including by the support of multiple classes of service.

The Available Bit rate (ABR) service defined by the ATM Forum supports data applications and emerging rate-adaptive multimedia applications in Asynchronous Transfer Mode (ATM) networks. Its operation relies on an effective congestion control mechanism. Rate based congestion control has been considered desirable to achieve high performance over high speed networks that are characterized by large bandwidth-delay products. The potential of this scheme to achieve low loss is by maintaining a smooth flow of data with the source rates being adjusted through a feedback mechanism. This allows intermediate systems (switches) to have relatively small buffers while still maintaining high utilizations.

In contrast, although known window flow control has undergone several refinements to also maintain a smooth even flow of data, there are several conditions during which window flow control results in bursty arrivals into the network. The smooth flow of data packets in response to the arrival of acknowledgements is disturbed in cases where there is ack-compression, new flows starting up, or when multiple flows recover from packet loss, and go into slow-start.

Allowing the applications to "fast-start", that is, to transmit as fast as reasonable upon startup and entry into the network, is desirable for many data applications.

Known rate based congestion control seeks to allocate the source rates so as to achieve high resource utilization, while maintaining feasibility—that is, the capacity of any resource in the network—primarily link bandwidth—is not exceeded at any time. Even a small excess in the source rate, can cause a queue buildup. The ABR service can ensure a particular known notion of fairness—max-min fairness which requires a distributed computation. An incremental computation that scales with the number of connections is described in Kalampoukas, Varma and Ramakrishnan, "An Efficient Rate Allocation Algorithm for ATM Networks Providing Max-Min Fairness", Proceedings of $6^{th}$ IFIP International Conference on High Performance Networking, HPN 95, Palma De Mallorca, Spain, Sep. 11–15, 1995, incorporated by reference.

The incremental computation of source rates can potentially result in the rates being infeasible for short intervals (often one round-trip time). Varying feedback delays that result in asynchronous updates to source rates make the control of this period of infeasibility difficult to predict. Several other practical situations also make it difficult to ensure feasibility, which include changes in the capacity due to the presence of higher priority traffic, changes in the number of users as they arrive or depart, and the desire of sources to opportunistically utilize available bandwidth.

The desire to make optimum use of bandwidth extends to the desire of data applications to ramp up as fast as possible on startup and entry into the network. All of these causes transient situations that can result in queue buildups, which are sometimes substantial.

One known way to ensure feasibility is to force a source increasing its rate to delay any increase until all other sources have received and implemented their decreases. Thus, the aggregate rate at a given link will never exceed its capacity. This method introduces considerable delay to sources when they start up or when they are asked to increase their rate, thus impacting applications (and user-perceived performance) adversely. It may also lead to underutilization of resources. In addition, when the bandwidth in the network changes, there is a certain time taken to provide feedback to the sources so that they may change their source-rates accordingly. The build-up of the queues during this transient period cannot be avoided even by schemes that are extremely conservative in ensuring feasibility.

Unlike the scheme for instance proposed in Charny, Ramakrishnan and Lauck, "Time Scale Analysis and Scalability Issues for Explicit Rate Allocation in ATM Networks", IEEE/ACM Transactions on Networking, August 1996, incorporated by reference, in the ATM Forum's ABR service attempts to maintain feasibility and avoid a large queue buildup by picking conservative values for the "increase parameter", RIF and the initial cell rate ICR (see Sathaye, "ATM Forum Traffic Management Specification Version 4.0", (Draft), AF-TM 95-0013R10, ATM Forum Traffic Management Working Group, February 1996, incorporated by reference). However, even a small ICR and RIF, can still result in substantial queue buildups.

Overall then, although attempts have been made to control and manage congestion over computer and other networks and particularly upon startup, none can be viewed to operate optimally or near optimally over a wide range of network conditions.

SUMMARY OF THE INVENTION

The invention improving upon these and other aspects of the network art relates to a system and method for startup management, including mechanisms to allow sources entering networks to maintain high resource efficiency and drive link underutilization and other undesirable effects to much reduced levels.

The invention in another aspect relates to a system and method for startup management which drives oscillatory artifacts to lower levels, increasing bandwidth use and efficiency.

The invention in another aspect relates to a system and method for startup management which permits sources to start up aggressively in the network, without disturbing the overall balance of utilizations and flows or affecting overall fairness across the network allocations.

BRIEF DESCRIPTION OF THE DRAWINGS

FIG. 15 illustrates generalized pseudo code for rate reduction in a network environment the invention may be practiced in.

DETAILED DESCRIPTION OF THE DRAWINGS

Figure 1:
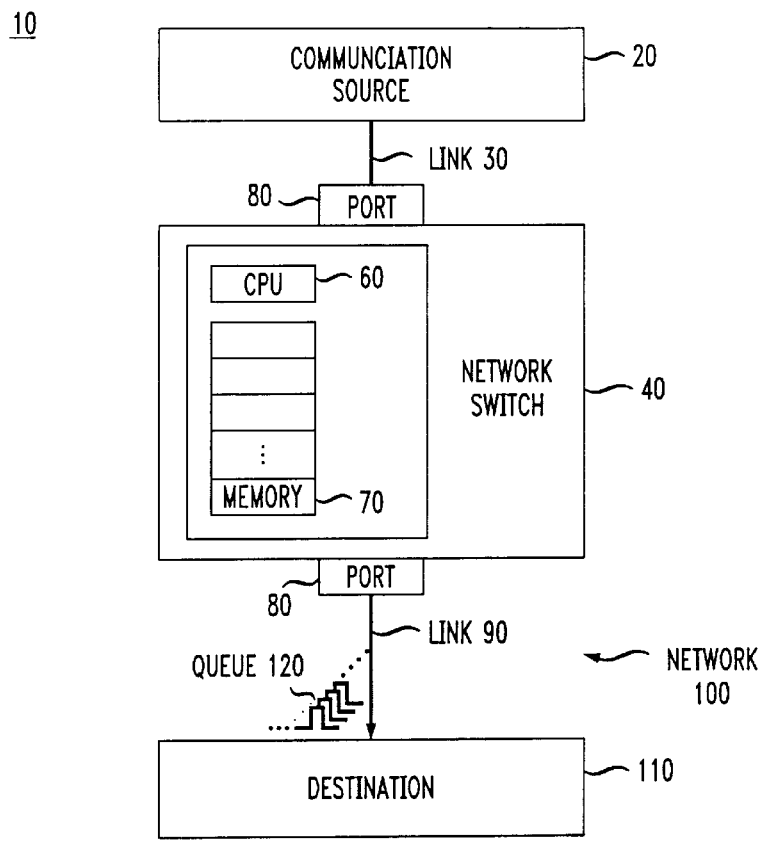
FIG. 1 illustrates a schematic diagram of a schematic diagram of a link in communication system in which the invention may be applied.

The operation of the startup management system and method according to the invention will be described, taking account of source and switch policies. First a review of the network environment in which the invention illustratively operates is provided, including to describe rate-adjustment techniques. The startup management system 10 of the invention will be described first in general with reference to FIGS. 1–15. In the invention a request for communication bandwidth (VC) is tendered by a communication source 20, in the form of an ER (explicit rate) value in an RM cell. An RM cell contains both the ER (request) field, and a CCR field. The CCR field is an indication of the current rate that source 20 is transmitting at. The ER value gets reduced or marked down, as the RM cell traverses network 100, to the smallest value of available bandwidth in connective links in network 100 (that is, to reflect the narrowest segment of the communication pipeline).

Source 20 can be a source of voice, video, audio, computer, facsimile, or other data intended to traverse the network 100, and be delivered to destination station 110. The maximum rate possible for individual sources varies with network configuration and other factors, but can fall in the range of up to megabits per second, or higher. Phone line, optical cable, cellular, microwave and other types of communication connection technology can be used to form link 30 between source 20 and switch 40 (and link 90 between switch 40 and destination 110).

The requested rate of source 20 reaches and is registered by network switch 40, of which a plurality are located throughout the network 100. Network switch 40 contains a processor 60, memory 70, ports 80 and associated hardware, as will be appreciated by persons skilled in the art. Following is a more particular examination of the network environment in which the queue management system and method of the invention illustratively operates.

A. Network Environment in which the Invention Illustratively Operates, and Its Installation Therein To describe the network environment in which the invention operates in more detail, queues 120 can accumulate in any link in a path because of asynchronous rate updates, the presence of high priority traffic, and varying network conditions. The inventors have discovered that even with a very small initial source rate (ICR) and rate increase factor (RIF), the queue size can increase to a few tens or even a few hundreds of thousands cells in a short period of time, affecting all sources and users connected through that path of the network.

In broad terms, most prior queue reduction techniques have suggested maintaining a low buffer occupancy by keeping the utilization of the link below the full capacity (e.g., having a target utilization of 95%). The invention in contrast seeks to maintain the utilization of link 90 at the maximum (that is, goal of 100%) at the very outset of connection.

The invention illustratively operates in the context of networks using explicit rate control schemes, which depend on a set of cooperating sources 20 periodically probing the network for the appropriate transmission rate. The goal of an explicit rate control scheme is to respond to incipient congestion, and to allocate rates to the competing sources in a fair manner, while ensuring feasibility.

Each source of a virtual circuit (VC) periodically transmits a special resource management (RM) cell to probe the state of the network. It specifies a "demand" or desired transmit rate in an ER-field in each RM cell. In addition, to the currently allowed rate (ACR), which is the rate at which queued cells are transmitted out of the network interface is transmitted in the CCR field of the RM cell.

Each switch computes the rate it may allocate to each VC, and overwrites this allocated rate in the ER-field if the computed rate is lower than what was in the received RM cell. As the RM cell progresses from the source to destination, the ER-field value reflects the smallest rate allocated by any of the switches in the path for the VC.

On reaching its destination, the RM cell is returned to the source, which now sets its transmit rate based on the ER-field value in the returned RM cell and a specified policy.

In terms of source management, source policies are a simplified version of those known in Sathaye, "ATM Forum Traffic Management Specification Version 4.0". Primary properties of the feedback control loop have been implemented, without incorporating all the issues relating to the boundary and failure cases. Sources maintain a DEMAND (for data sources this may be the outgoing link's rate), used for requesting a rate from the network. When an RM cell returns with an allocated rate ER, the source's allowed rate is changed as follows:

if (ACR<=ER)

$ACR \leftarrow \max(\min(ER, DEMAND), MCR)$ else $ACR \leftarrow \max(\min(ACR+(RIF*PCR), ER), MCR)$ Notice that a request to decrease the rate takes effect immediately. On the other hand, when ER received by the source is higher than the current ACR at the source, ACR is increased additively by a step size of RIF*PCR. The increase factor RIF is a negotiated parameter, and PCR is the peak cell rate for the connection. ACR always remains above the minimum source rate MCR.

When an RM cell is transmitted, the ER-field is set to max(DEMAND, ACR). RM cells are periodically transmitted, once every Nrm data cells (e.g., Nrm=32). A large RIF results in reaching the network allocated rate, ER, quickly, but with the potential for some transient overload on the network. Motivated by a desire to keep queues small, RIF is often chosen to be small (observations are made on this "typical" choice below).

There are several switch algorithms known or proposed in the art for computing the rate to be allocated to a VC. Generally, switches compute an allocated rate for each VC i, based on its requested rate (value in the ER-field) $A_i$. VCs are classified as being either "satisfied" (in set S) or "bottlenecked". The capacity C of the link is allocated to bottlenecked VCs as:

$$A_B = \frac{C - \sum_{i \in S} A_i}{N - \|S\|} \quad (1)$$

A global procedure performing the maximum computation is described in Bertsekas and Gallagher, "Data Networks", Prentice Hall 1992, Chapter 6; and Charny, Ramakrishnan and Lauck, "Time Scale Analysis and Scalability Issues for Explicit Rate Allocation in ATM Networks", IEEE/ACM Transactions on Networking, August 1996, both incorporated by reference. Since an incremental calculation is done upon the arrival of an RM cell, the $A_i$ for $VC_i$ is equal to the "demand" seen in the ER field of the RM cell. The allocated rates for the other VCs are the allocations made when the computation was performed when their forward RM cell was processed. The $A_i$ for the other VCs was their previous allocation.

Given the current knowledge of the allocations to the VCs, there are identified from the set of all flows, those flows that appear to be satisfied, then determine the total bandwidth consumed by those flows, and divide the remaining bandwidth equally between the flows bottlenecked locally (denoted by set β). A straightforward computation of the local max-min fair share (denoted $A_B$) can be described as follows, and as known in the art:

1. Initialization: S=0.
2. $A_B^0 \leftarrow C/N$, for all flows $i \in \{i | A_i < A_B^0 \ \& \ i \in S\}$.

$$A_B^1 \leftarrow \frac{C - \sum_{i \in S} A_i}{N - \|S\|}. \quad 3.$$

4. If for all flows $i \notin S$, $A_i \geq A_B^0$ then go to step 5 else go to step 2.
5. Mark the final value of $A_B^j$ (after j iterations) as $A_B$.

(Other discussions of implementing max-min fair allocation computations can be found for instance in L. Kalampoukas, A. Varma, and K. K. Ramakrishnan, "Examination of TM Source Behavior with an Efficient Switch Rate Allocation Algorithm", presented Jun. 6, 1995 at ATM Forum Meeting, Orlando, Fla. and the inventor's patent application Serial No. 08/460,965 filed Jun. 5, 1995 and each fully incorporated by reference).

Subsequently, the allocation for the VC i, whose RM cell was received, is marked as follows: If $A_B \leq \min(ER_i, CCR_i)$, then $A_i = A_B$, and the VC is marked bottlenecked (put in the set β). Otherwise, $A_i = \min(ER_i, CCR_i)$ where $ER_i$ is the Explicit rate ("demand") value in RM cell, and $CCR_i$ is the value in the CCR ("current cell rate") field of the RM cell.

The known distributed rate allocation algorithm described above goes through several "global iterations" achieved by RM cells flowing from the source to destination and back, collecting the rate allocation information for that flow. Further, there is a "local iteration" at each switch 40 link to determine the allocation to each of relic flows sharing that link.

At the first step of the global iteration, the allocation of all the flows sharing the first-level (tightest) bottleneck is determined. Subsequently, in each of the next steps of the global iteration, the allocation of flows sharing the next-level (next-tightest) bottlenecks is determined, progressing from one bottleneck level to the next, till finally an allocation of the rates to the flows sharing the $K^{th}$-level (loosest) bottleneck in the network is made. It is known that an upper bound on convergence time of such distributed algorithms determining a max-min fair allocation is approximately K*RTT, where RTT is the maximum round-trip delay for control information to propagate from the source through the network to the destination, and back to the source. K is the number of different bottleneck rates. There may be significant queuing delays for RM cells, as well as propagation delays (e.g., in a wide-area network), which contribute to RTT. As a result of a richly connected network, each link having diverse numbers of flows sharing them or with sources having different demands, the number of distinct rates, K may be large as well.

In a network environment as just described, the queuing behavior using a known explicit rate based congestion control mechanism can be examined. Both a common queue and a per-connection based queuing structure are considered. The corresponding scheduling mechanisms would be first-in-first-out (FIFO) or Round-Robin (RR).

The rate allocation performed at any given link 90 for a VC can only take effect after the RM cell has returned back to the source. During this time the queue 120 can be built up if a different VC that has a shorter feedback delay ramps up its rate. The larger the differences in the delay, the worse the buildup of the queue 120.

To understand the queuing behavior better in relationship to the feedback delay, the inventors have built a cell level event-driven simulator, using which much of their study has been of a simple network configuration that contains two switches. Each switch is attached with a few (ranging from 3 to 500) host nodes with links having different propagation delays. There are 2 types of VCs in the configuration (FIG. 2) shown:

Long VCs: with the first link having an 8 millisecond propagation delay.
Short VCs: with the first link having a 0.8 μsecond propagation delay.

Three source policies are examined, that progressively add small amounts of functionality at connection setup:

The ATM Forum-based policy for the source, where the source's initial rate a "statically picked" ICR, and the increase, when allowed, is by a factor RIF.

The policy marked "RATE", where the source sets the initial rate ICR based on computing the max-min fair share, when the connection setup message arrives at the switch. However, the allocation is made at the switch for the VC only upon encountering the first RM cell from the VC when it begins transmitting data.

The policy marked "RM", where the initial rate ICR is set based on computing the max-min fair share when the connection setup message arrives at the switch 40. Further, the connection setup is treated as an RM cell so that the allocation is performed at the switch 40 when the connection setup message arrives. The connection setup provides an early "warning" of a new VC's arrival to all of the others.

In practice, standard practice is to favor a small initial cell rate (ICR) because it avoids having a large burst load on the network 100 occurring suddenly when a VC starts up. However, it has been the inventors' contrary observation that a small ICR does not always result in a smaller queue length at the bottleneck. This is particularly true when there is significant disparity between the round trip times of the various connections, as in the configuration shown in FIG. 2.

Figure 2:
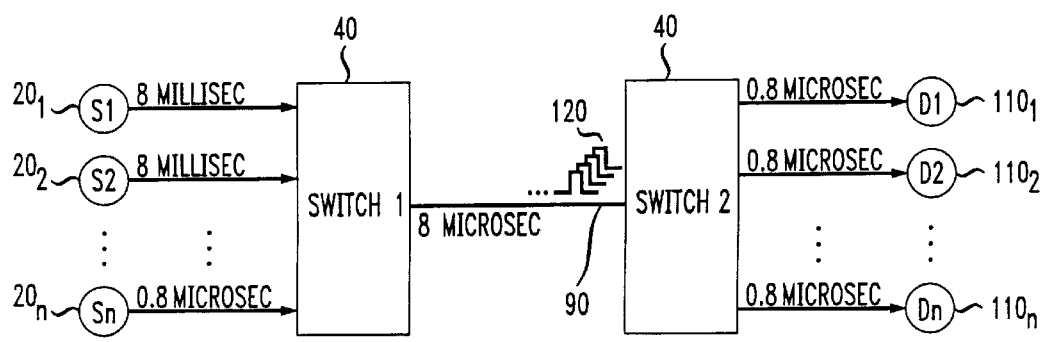
FIG. 2 illustrates a schematic block diagram of a two-switch network topology in which the invention may be applied.

A large ICR helps applications. For example, RPCs that have a burst of small messages may benefit from high ICR, rather than wait one or more round trips in ramp up to the max-min fair rate (especially for RIF<<1). Secondly, if the network 100 is idle or not fully-utilized, starting with high initial rate can avoid under-utilization during the startup phase, and the invention exploits this phenomena. The workload used on the configuration in FIG. 2 is as follows: one long VC starts at t=0; two short VCs start at t=400 and t=800 milliseconds. All the VCs are greedy, and have infinite amounts of data to send in this example.

Figure 3:
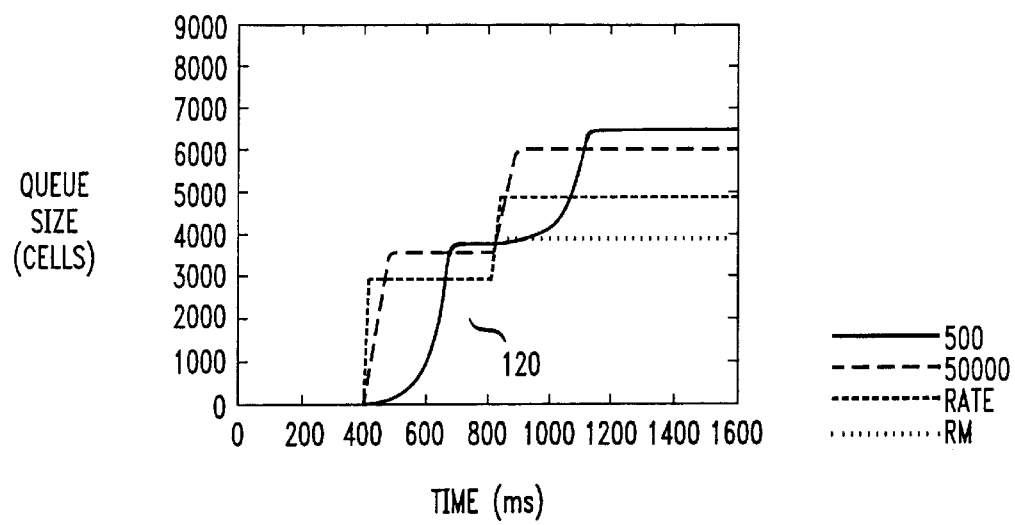
FIG. 3 illustrates data for queue size for different ICR under certain conditions.

FIG. 3 shows the behavior of the growth of the buffer size with time, for 4 different cases. All of these were with a conservative rate increase factor (RIF) of 1/512. The four cases are: ICR set to 500 cells/sec. for each source 20 starting up; ICR set to 50000 cells/sec. for each source; the RATE option; and the RM option in which aggressive startup is made possible, in the invention.

When the short VC arrives at t=400 milliseconds, this causes a queue 120 to begin building up. This is because the short VC encounters several steps of increase, by small amounts, for each decrease by the long VC. The decrease by the long VC is commensurate with the amount that the short VC has increased from its initial ICR, at the time the long VC's RM cell is processed. During the feedback delay for the long VC, the short VC can now increase by several steps (many RM cells are fed back to it). The further arrival of another "short VC" at 800 milliseconds causes a further queue to buildup.

Thus, a larger queue is seen at the switch 40 with a small ICR=500 cells/sec., compared to having a larger ICR of 50,000 cells/sec. (this is likely to be true only as long as the ICR is smaller than the final max-min fair share of the VC).

A further problem more particularly attacked by the startup management system and method of the invention is the lower utilization of the bottleneck link 90 when the source starts up with a small ICR. The behavior of the queue 120 can be further explained by observing the source rates of the VCs, as they start up, shown in FIG. 4. The rate for the existing long VC gradually decreases as the new short VC ramps up its rate. Looking closely at the time when the sources all converge to the new rate, there is a brief period where the short VC reaches its final max-min fair share, while the long VC has still not reduced down to its steady state due to its feedback delay. This infeasibility results in the queueing observed in FIG. 3.

Figure 4A:
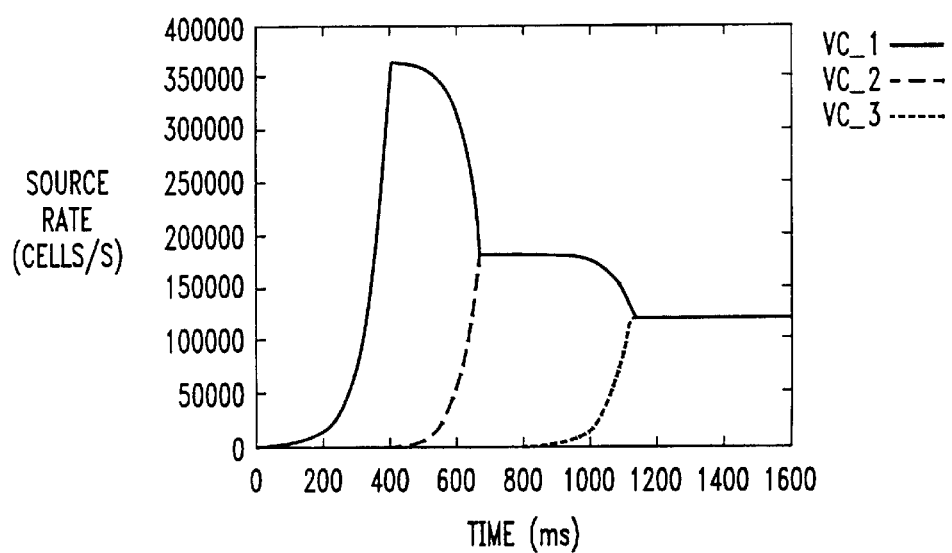
FIGS. 4(a) and 4(b) illustrate data for source rates with different ICRs.
Figure 4B:
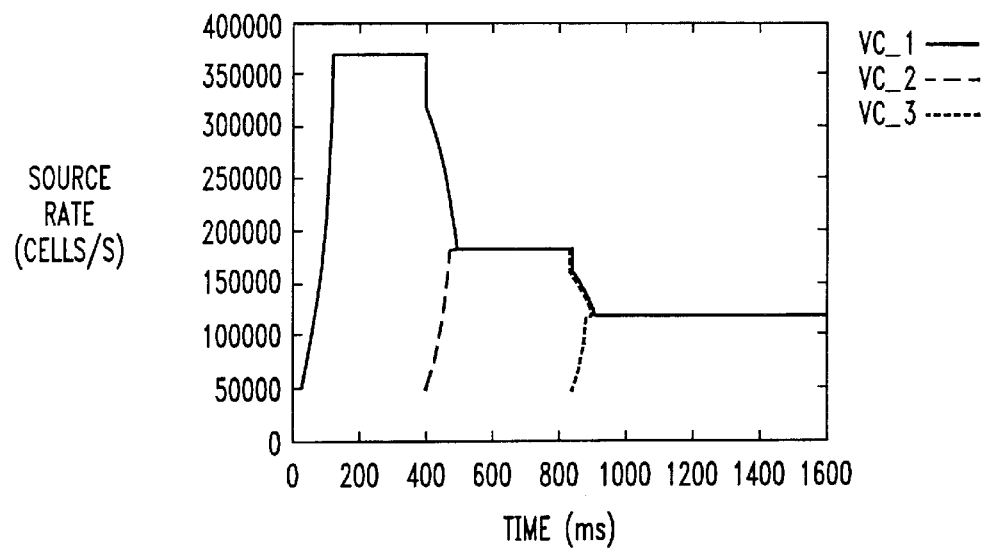

A larger ICR (FIG. 4(*b*)), for the "short VC" (VC 2 and VC 3) rapidly withdraws allocation from the existing "long VC" (VC1). This steeper decrease reduces the interval over which there is an overallocation of the capacity, reducing the queue buildup. FIG. 3 also shows the behavior of the queue with the RATE and RM alternatives for startup behavior that the inventors believe are more attractive, effective and efficient. The RATE alternative brings down the queue from almost 6K cells to a little less than 5K cells in this particular example.

With the RM option applied in the startup management of the invention, this reduces the queue to an even greater degree: down to nearly 4K cells. This reduction in the queue size is also accompanied by the same reduction in underutilization observed when starting at a large ICR. Employing the RM option at startup, the source rates of the new sources start at what will be their max-min fair share, and the rates of the existing sources drops immediately to its corresponding fair share, as well.

As a result, the period of infeasibility is minimal (at most one round trip time for the long VC). This results in only a small amount of queueing.

Thus, a small initial cell rate does not always result in a small size of queue 120. Particularly with algorithms that compute the allocation on an incremental basis, having an ICR that is high allows for a quicker correction of the rate for long VCs, and thus a lower queue length at the switch 40 in the implementation of the invention.

Traditional perception has been that per-VC queueing in contrast provides isolation and therefore results in generally better queue and delay characteristics. However, one characteristic of per-VC queueing is observed here, that results in larger aggregate queues at the switch. When a cell (consider it to be the "marked" arrival) arrives at a non-empty queue subsequent arrivals to different queues can cause additional delay for the marked arrival before it is served. The additional delay experienced by RM cells of an existing long VC which already has a reasonable queue at a switch 40 is of concern. Since the queues are served in round-robin fashion, this RM cell (of the long VC) has to wait its turn to be served. If in the meantime, a short VC starts up, and rapidly ramps up its wait, it contributes to the delay of the long VC's RM cell. This increased feedback delay (in comparison to FIFO queues) results in additional queueing (from 6500 cells for FIFO to about 7800 cells for per-VC queues).

Figure 5:
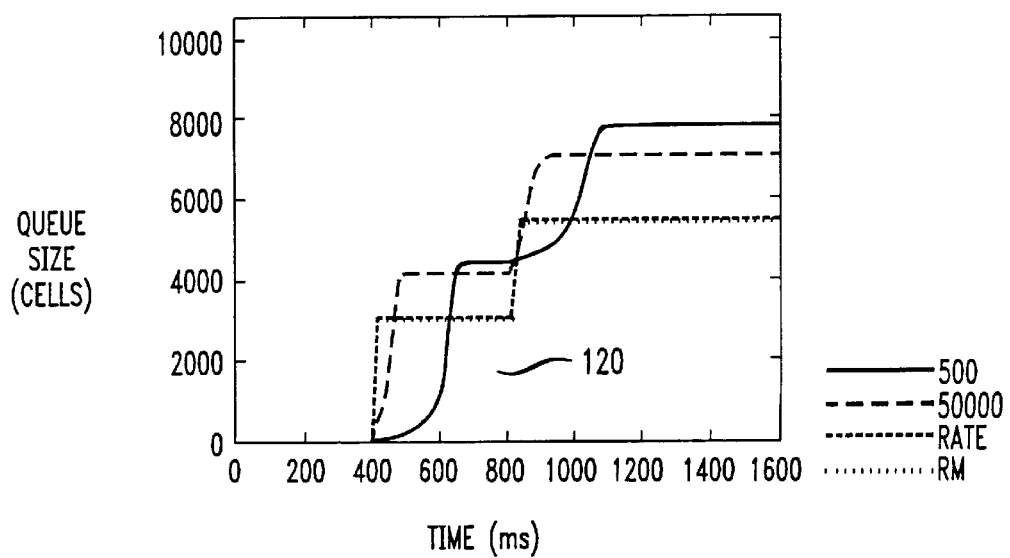
FIG. 5 illustrates data for queue size for different ICR under certain other conditions.

In fact, the effect of a smaller ICR on the growth of the queue is even greater with per-VC queues, as seen in FIG. 5. Of interest also is that the difference in the queue sizes with the RATE and RM cases nearly disappears. This is because the additional delay in the RATE option waiting for the first RM cell to perform the allocation is negligible compared to the additional feedback delay introduced for the long VC because of the effect of future arrivals with per-VC queueing.

Thus, while per-VC queueing is typically expected to provide much better queue and delay behavior, it is not always the case. To recoup back the desirable characteristic of per-VC queueing, there is a need to introduce additional mechanisms that manage the queue, and keep it small.

Figure 6:
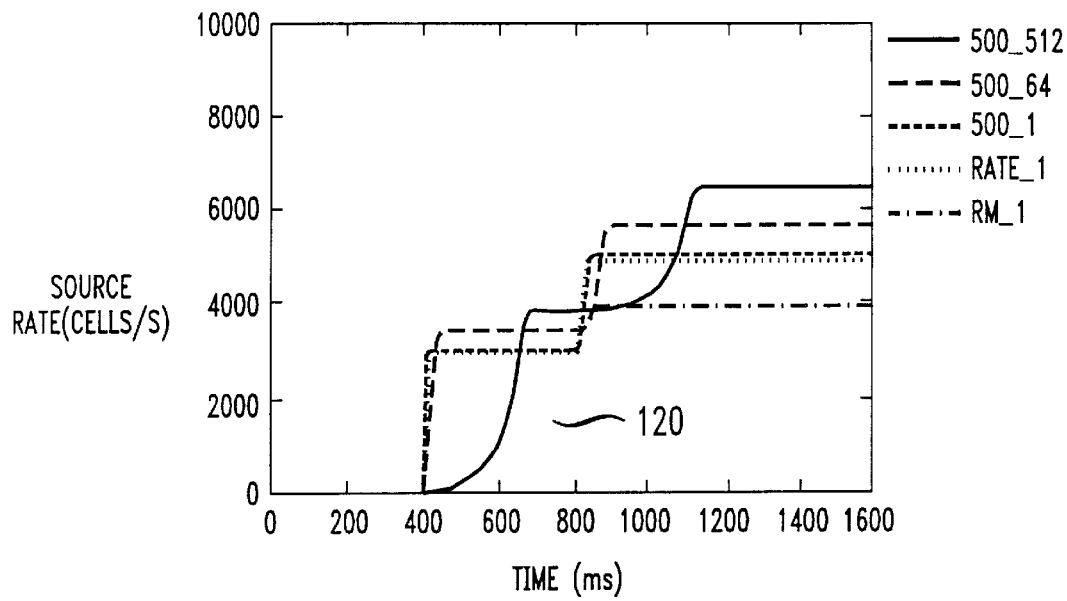
FIG. 6 illustrates data for queue size for different RIF under certain conditions.
Figure 7:
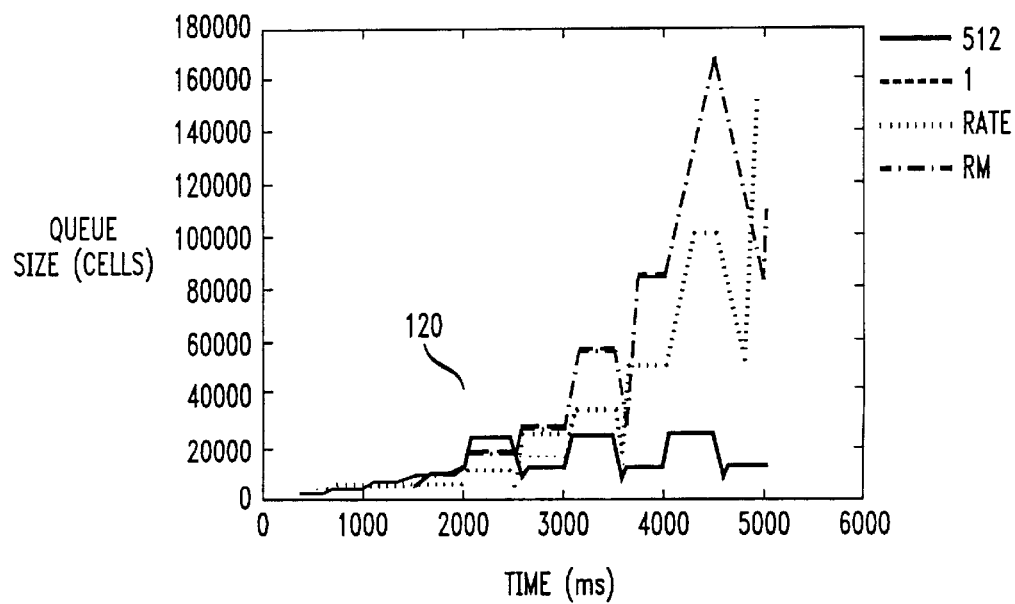
FIG. 7 illustrates data for queue size under different dynamic bandwidth conditions.

In terms of reduction methodologies, similar to the situation with a small ICR, a small RIF also leads to a substantial queue. An RIF of 1/512 results in a queue of 6500 cells. Increasing RIF to 1 reduces the queue to 5000 cells. We believe that as long as ICR is small compared to the final max-min fair rate of the source, larger values of RIF result in a smaller eventual queue build up. FIG. 6 shows the behavior with an ICR of 500 cells/sec., with FIFO queues for varying values of RIF. The queue 120 reduces slightly with the RATE option, compared with the ATM Forum policy with an RIF of 1. When using the RM option of the invention, the queue drops down farther, to almost 4000 cells.

Similar behavior is observed for the queue with per-VC queueing as well. The aggregate queue is generally larger with per-VC queueing.

One major concerns with end-to-end rate control mechanics is the responsiveness to dynamic changes in the available bandwidth of network 100. When the available bandwidth to the ABR service class reduces, it takes a certain amount of time for the sources to react to the reduction in bandwidth (the switch 40 has to perform the reallocation as subsequent RM cells arrive, and then feedback reaches the sources 20). During this period, the aggregate rate of the ABR VCs may exceed the capacity, resulting in queueing at the bottleneck. The larger the amount of bandwidth reduction, the higher the queue buildup, potentially leading to cell loss.

The model used for change in the link bandwidth is for a constant bit rate (CBR) VC to turn ON and OFF, periodically. First a set of four VCs using the ABR service arrive one after the other, are considered. At about 2 seconds, the CBR VC is introduced, which takes 50% of the bandwidth away from the existing VCs. This results in a queue buildup. The CBR VC remains ON for 500 milliseconds, and then is OFF for another 500 milliseconds. This ON/OFF pattern repeats for the CBR VC. It can be observed from FIG. 7 that the buildup of queue 120 can be substantial. Using a small initial cell rate of 500 cells/sec. and a conservative increase factor (RIF) of 1/512, results in a queue buildup to about 20K cells each time the CBR VC turns ON, and drains back to about 10K cells when it goes OFF. However, when an RIF of 1 is used, there is a substantial queue buildup, reaching almost 180K cells. Using the RATE and RM options, (with RIF=1), the queue buildup is almost identical to the case with an RIF of 1 with the ATM forum policy. When the bandwidth of link 90 changes, this has less impact for the RM option also, because the early warning is provided only when ABR VCs startup. It is clear that the large RIF has a substantial impact, resulting in the queue buildup. The behavior with per-VC queueing is similar.

Figure 8A:
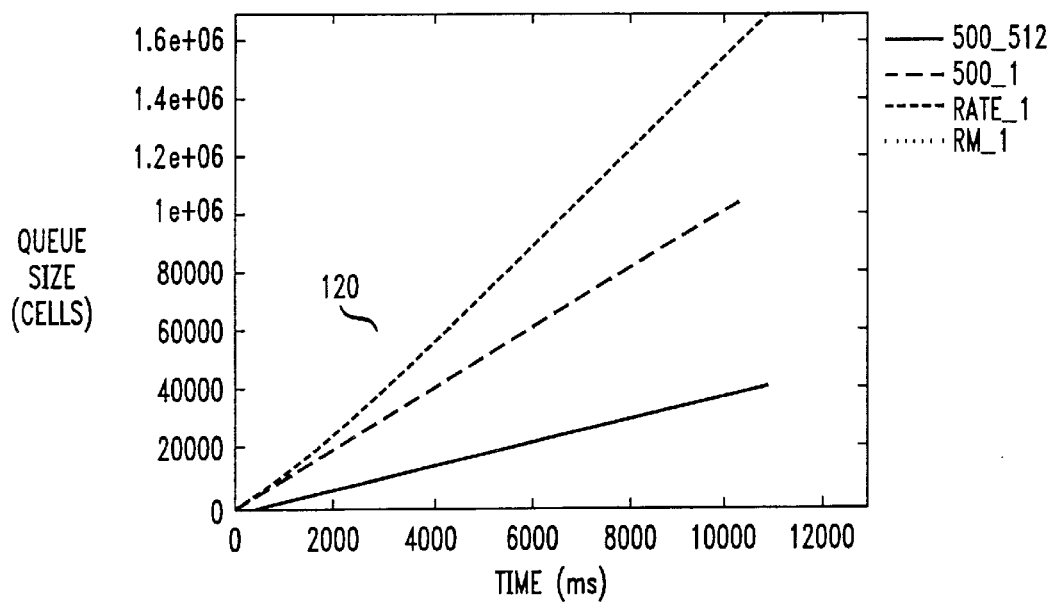
FIGS. 8(a) and 8(b) illustrate data for queue size for 500 VCs under certain conditions.
Figure 8B:
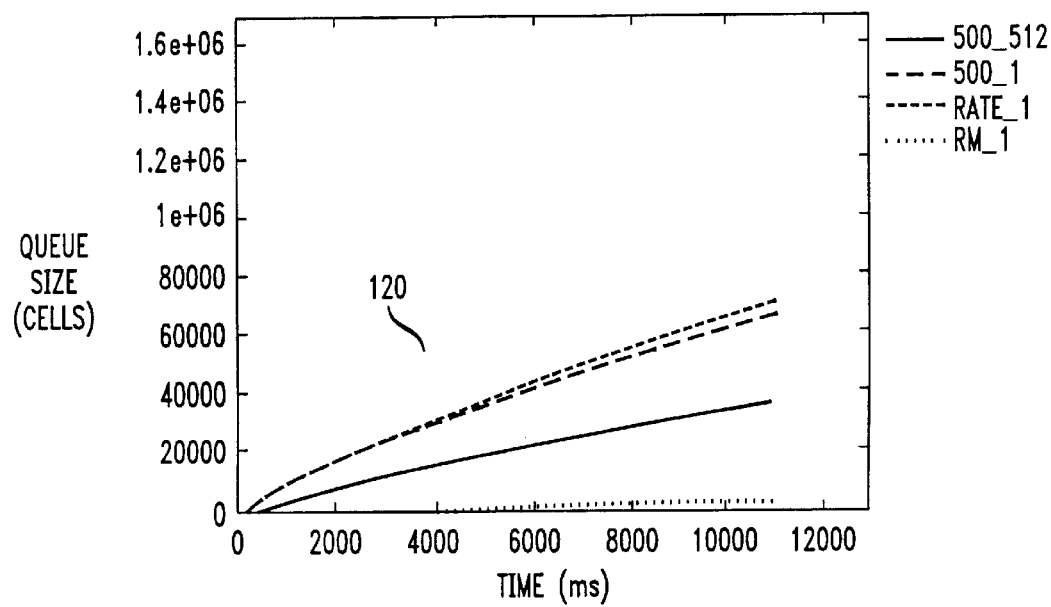

FIG. 8 illustrates the effect of having a large number of VCs. A total of 500 VCs startup, each starting up in a staggered manner, 20 milliseconds apart. The first 250 VCs that startup are long VCs. Then, the next 250 VCs that startup are short VCs. It is seen from that figure that there is a dramatic queue buildup, both with FIFO queues as well as with per-VC queues. With FIFO queues, and an initial rate of 500 cells/second, and an increase factor, RIF, OF 1/512, the queue builds up to about 400,000 cells. When RIF is increased to 1, the queue 120 builds up to a little over 1.1 Million cells. With the RATE option, the queue builds up to nearly 1.6 Million cells. The behavior with per-VC queues appears to be somewhat better.

The RM option employed in the invention on the other hand has a substantially smaller queue buildup. The dramatic reduction in the queue is due to the early-warning provided to the other VCs when a new VC starts up. But the scale should be borne in mind: even for the RM option, the queue buildup is relatively large with both FIFO and per-VC queues (about 12000 cells for FIFO and 45500 cells for per-VC queues).

The inventors conclude it is essential that a good queue reduction mechanism like that of the invention be incorporated to complement even the best rate allocation mechanism that is used in the switches, to reduce the queue buildup in all of the scenarios observed to date.

B. Startup Management According to the Invention

Given all of these considerations in the environment of network 100 in which the invention illustratively operates, in the invention one focus is on managing the entry of sources 20 into the network 100, at faster rates. When a source 20 is prepared for connection to the network, the current cell rate is defined to be the peak cell rate. Peak cell rate is a negotiated parameter between source 20 and network 100; if the peak cell rate can not be resolved, the system and method of the invention defaults to the initial link rate.

Broad design goals for the startup management system and method of the invention 10 include the following:

Allow sources to start-up aggressively. It is desirable to allow sources 20 to start transmitting at a reasonable rate (interpreted to be the max-min fair rate) close to the steady-state value as soon as possible after connection setup.

Allow sources to aggressively ramp-up the newly allocated rate. When a source 20 is allowed to increase from its current rate, it is desirable to allow the source to quickly increase its sending rate to the new value. A slow increase, while helping in maintaining the rates close to the "feasible" rate, may result in link under-utilization.

Drain queues as quickly as they buildup And, minimize link under-utilization and avoid oscillations in the source rate and the queue size while draining the queue.

Maintain Max-Min Fair share allocation Consistently, even during the periods when the queue 120 is being reduced.

In carrying out these goals, the invention may be implemented in the network environment which uses of the concept of a target set-point for the queue size at an individual link, above which the function required to reduce the queue 120 is initiated, as described in the inventors' copending U.S. patent application entitled "QUEUE MANAGEMENT SYSTEM AND METHOD FOR NETWORKS", filed concurrently with this application, assigned to the same assignee as this application, and fully incorporated by reference. Queue reduction in that environment is achieved by modifying the proportion of the capacity of link 90 available to be allocated among the competing sources 20. The total link capacity used for all ABR VCs is reduced. Reducing the capacity available for all ABR VCs is then used to implement a reduction in the allocations only for those VCs that are bottlenecked at this link 90. The actual queue 120 seen does not reflect the number of cells that should be drained, once draining starts taking effect.

If the decision of how much capacity to use based solely on the instantaneous size of actual queue 120, it would cause under-utilization, oscillations of the queue or takes a very long time to drain the queue because of a very conservative setting of parameters. This freedom from dependence on instantaneous values, is an advantage of the invention over known queue management techniques.

An approach exploited in that environment is the fact that all the sources 20 participate in the process that maintains max-min fair rates, so that the aggregate rate remains feasible (that is, does not exceed the capacity of any resource in the network 100). Any excess load on a link is therefore primarily due to transient effects of increases and decreases in individual source rates. These may be relatively small, depending on the parameters. Thus, when the queue 120 does build up, the system and method of the invention strives to keep the reduction in the rates of the VCs to be relatively small. This is to minimize underutilization, and excessive oscillation of the rates. Since the reduction of the queue 120 can only begin when the feedback reaches the source 20, the dominant parameter for reducing the queue is the feedback delay.

A large reduction of the capacity of VCs (actually, reduction of capacity of the link allocated to all the VCs, i.e. pretending that capacity is lower) for the purpose of reducing the queue buildup does not help as much, especially in wide-area networks, and in situations where the feedback delay to different sources is widely different. As long as the number of cells queued is not unreasonably large (which would cause too much delay and possibly cell loss), the gain in reducing the capacity by a large fraction does not provide substantial additional help. This is different from other efforts that reduce the queue substantially.

Once queue 120 builds up, in that environment it is desired to reduce the capacity used for all ABR VCs, so that the aggregate arrival rate will be reduced, hence draining the built up queue. The first thing to decide is how much capacity to reduce, given the size of the queue 120. In that reduction environment, it is preferable that the shape of the rate reduction function provides a smooth reduction in the link capacity allocated, as a function of the queue size. As the queue size rises substantially above the set-point, the reduction in the allocated capacity increases more rapidly. Finally, when the queue size reaches a multiple of the set-point, the amount of reduction in the capacity reaches a ceiling. A conservative ceiling is chosen so as to ensure that not too substantial a fraction of the bandwidth is utilized for the reduction of the queue 120. Having a large reduction fraction potentially results in oscillations in the rate of the sources, which is undesirable.

Let C be the total capacity used for all ABR VCs. In the illustrative environment that the invention operates in, the amount of reduction in the capacity is given by the following function:

$$R=a(x-S)^2+b(x-S)+c \quad (2)$$

Figure 9:
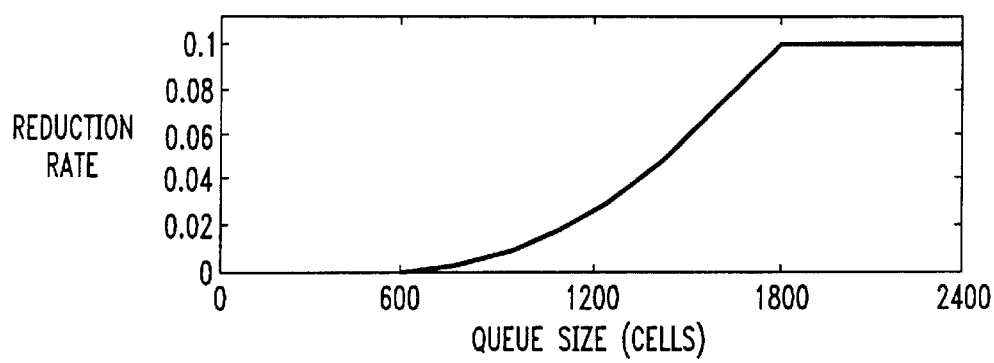
FIG. 9 illustrates data for a rate reduction function for a certain set point.

The capacity C−R is the amount allocated to all the flows making a request. Let M be the maximum value allowed for the rate reduction R. S is the set-point for the queue, and x is the instantaneous queue size at the link. a, b and c are parameters for the equation solved using the following three points:

$$(x,R)=\{(S,0),(2S,M/4),(3S,M)\}$$

or expressed differently:

x=S, R=0 x=2s, r =M/4 x=3S, R+M and solve a, b, c from these three equations on the curve (FIG. 9). The motivation is to keep a smooth reduction of the capacity just around the set-point, S, and have a more rapid reduction as the queue builds up.

In experiments, the inventors chose S to be 600 cells, and the bound for the total capacity reduced for queue reduction, M, was chosen to be 10%. Given the amount of rate reduction as a function of the queue size using the quadratic function in equation (2), this rate reduction is applied for a time period, not necessarily known in advance, until the queue drains.

It is possible to use other reduction functions, with a different shape for the reduction in the capacity, compared to the one shown in FIG. 9. For example, the inventors have also successfully applied cubic and exponential functions but the quadratic has the best performance. The inventors have observed that using a smoother function when the queue size is close to setpoint, helps to avoid oscillations. But, the queue drained excessively slowly. Reducing the interval over which the queue 120 is drained (changing from (S,3S) to (2S,3S)) increases the oscillations of the queue. An initial choice of the setpoint to be 600 cells was based on having a reasonable target of 2 milliseconds worth of delay contributed per hop, and buffering a small number (about 3) of IP packets (9K bytes each) before impacting the capacity on a 155 Mb/s link.

When queue 120 begins to be drained, the current size of the queue is not an accurate estimate of the aggregate buildup over time of the difference between the service rate at the resource and the arrival rates from the sources 20. Basing the reduction on the instantaneous queue size would result in oscillations of both the queue and the source rates, a hazard that prior known techniques are vulnerable to. This is particularly true in the presence of large feedback delays. If the rate reduction is applied until the queue completely drains, the feedback delay to the source 20 will result in underutilization of the link 90 subsequently, when the aggregate rate of the sources becomes less than the capacity for an additional round-trip time. This effect in the oscillation of the queue size has been examined in the art, using differential equations (see e.g. Bolot and Shankar, "Analysis of a Fluid Approximation to Flow Control Dynamics", Proc. Infocom 92, Florence, Italy, May 1992, incorporated by reference). The reduction of the rate of the sources 20 needs to be implemented such that overcorrection, and resulting underutilization of link 90, is avoided.

To enable draining the queue 120 quickly without causing under-utilization, the queue reduction environment that the invention illustratively operates in uses the concept of a "virtual queue" by tracking the size of queue that has to be drained, but which has not yet taken effect on the real queue 120. The virtual queue represents the difference between the maximum queue achieved in the current "regeneration cycle" and the aggregate size of the queue that has been reduced so far by the rate reduction mechanism during this cycle. This virtual queue is used to determine how much longer the rate reduction has to be applied. Regeneration cycles for queue length are known in the art (discussed for example in Ramakrishnan and Jain, "A Binary Feedback Scheme for Congestion Avoidance in Computer Networks with a Connectionless Network Layer, Proceedings of ACM Sigcomm 88, August 1988, incorporated by reference). In the context of the invention, generally speaking the start and end points of the regeneration cycle occur either when the previous maximal real queue size is surpassed, or when the reduced virtual queue size is smaller than the increased real queue size, implying that the queue is still building (although it does not exceed the queue maximum).

The allocated rate is reduced on an individual VC basis. VCs that are not bottlenecked at this switch 40 are allocated a rate lower than the rate for bottlenecked VCs by the rate allocation algorithm itself. An example of a rate allocation approach that can be suitably used is that reflected in copending U.S. patent application Ser. No. 08/760,174 entitled "ADAPTIVE CHANNEL ALLOCATION SYSTEM FOR COMMUNICATION NETWORK", filed Dec. 4, 1996, assigned to the same assignee as this application, and fully incorporated by reference. Although they may contribute to queueing on a transient basis (due to jitter and other events that may cause call bunching), the rate reduction mechanism does not (and may not be able to) address the effects of these transients. Thus, the rate reduction is applied only to the bottlenecked VCs. Thus, to reduce the queue built up, the allocations of the VCs bottlenecked are controlled at this link 90. Since all the bottlenecked VCs at a link have an equal share, only a simple boolean state variable representing whether the VC is bottlenecked or not, need be examined.

The state maintained at each link 90 is the following:

On a per port (p) basis, the following variables are maintained: the maximum queue seen in this regeneration cycle, (p.max_q); the amount of capacity (p.reducing_cap) reduced for the purposes of queue reduction, the size of queue drained so far (p.reduced_q), and the queue length at the time an RM cell was received on the port (p.prev_q) .

On a per VC (vc) basis, the time the last RM cell was received from that VC (vc.prev_rm_time,$t_{vc}$) is maintained, and the bandwidth reduction that this VC has contributed (vc.reducing_cap,$vc_r$). Thus, the total capacity reduction for the link 90 over the number of bottlenecked VCs using the link, can be tracked.

At any time t when a RM cell is received, if the VC is bottlenecked by the link 90, the number of cells being reduced (or the size of virtual queue being reduced) between this and the previous RM cells for this VC is:

$$vc.q\_reduced\ (t) = vc_r * (t - t_{vc}) \quad (3)$$

The instantaneous queue size at a link 90 is, in a natural sense, an integration over time of the difference between the input and the output rates, $r_i(t)$ and $r_o(t)$ as seen at the link 90. That is, $$x(t_1) = \int_{t0}^{t1} (r_i(t) - r_o(t))dt \quad (4)$$

The amount of rate reduction therefore can also be determined knowing the service rate and the virtual queue size. Since the queue is effectively an integrator of the difference in the rates, the relevant information is the largest queue size achieved (p.max_q) during this regeneration cycle, which has to be drained. Let the capacity of the link be C, and the reduced capacity allocated amongst all the bottlenecked VCs be c(t) (which is the value of R in equation (2) as a function of time). Assume that the queue 120 crossed the value of "set-point", S, at time $t_i$. If $t_j$ is the time until which the rate is being reduced, then the amount of queue reduced, $Q_r(t_j)$, $$Q_r(t_j) = \int_{ti}^{tj} (C - c(t))dt \quad (5)$$

The arrival of RM cells from each source 20 gives the necessary timing information that may be exploited to determine the amount of "queue-reduction" achieved by (5). The amount of reduction of the queue contributed by individual VCs is maintained at the switch 40 by knowing the time since the last RM cell arrived for that VC, according to equation (3).

In the illustrative environment of the invention it is sought to determine, dynamically, the time $t_j$ at which the queue reduction has to stop in a given regeneration cycle. Simplistically, $t_j$ occurs when the total amount of queue reduction achieved, $Q_r$ (by equation (5)) has reached $Q_r$= (p.max_q-S). Reduction is stopped when (p.max_q-$Q_r$) ≦S). However, this ignores the fact that there is feedback delay involved, and waiting till this amount of the accumulated queue is drained is inadequate. There is still one half-round trip time's (RTT) worth of cells sent at the source's incorrect rate, to be accounted for. These cells were transmitted from the source 20 from the time when the switch stopped applying the rate reduction up to approximately one half RTT (i.e., the delay form source to switch). Thus, the queue built up due to this excess rate has to be drained. Subsequently a correction factor is preferably applied to reduce the queue 120 for a slightly longer time period, $t_k$ beyond $t_j$.

A simple approximation for $t_k$ chosen by the inventors determines the current buffer size, $b_{rem}$ at the time $t_j$, when the queue reduction has reached the value (p.max_q-S). This $b_{rem}$ is now used as the amount of queue to be further reduced. Equation (5) is then iteratively used to determine how much further queue reduction should be applied. Since the queue size that is now used to determine the amount of rate reduced is now relatively small, the amount of reduction in the allocated capacity is also relatively small. There is a more gradual reduction in the queue. However this is not harmful, since the network is operating in the region where the amount of queue built up is also small.

When the queue 120 has been reduced to the setpoint, the bandwidth has to be released to the existing VCs. In a distributed rate allocation scheme that tries to take advantage of unused capacity by other VCs allocation decisions are based on what other VCs are currently using. However, with the presence of a large number of VCs, multiple existing VCs may arrive at the same conclusion, which leads to transient over-allocation. Oscillations in the queue size with therefore occur. To reduce the amount of oscillations that may result (even if the amount of bandwidth released is relatively small), the capacity of a VC to its max-min fair share rate is recovered gradually by allocating a share of the increased capacity to each of the bottlenecked VCs. The rate increase allowed for a VC is based on the maximum reduction in the rate that was allowed in this regeneration cycle and the number of bottlenecked VCs. When the allocation to a VC is increased, a ceiling function is applied to this increase. This is for an interval of up to one maximum round-trip time interval. Structured pseudo code for the reduction mechanism of the network environment of the invention is shown in FIG. 15. In that code (for example lines 39 to 54), it may be observed that if the current VC is reduced according to the previous RM cell, the mechanism recovers for this VC an amount being reduced in one round trip time. Also as reflected in the code, if the current total ABR capacity (after reduction) is lower than that for the last RM cell, the difference between the previous ABR capacity (after reduction) over the number of previously bottlenecked VCs and the current ABR capacity (after reduction) over the number of currently bottlenecked VCs, is recovered.

The inventors have examined the ability of the startup management system and method of the invention to control the queue size for the various scenarios examined above, with the same options for the startup and increase factors at the sources.

Figure 10A:
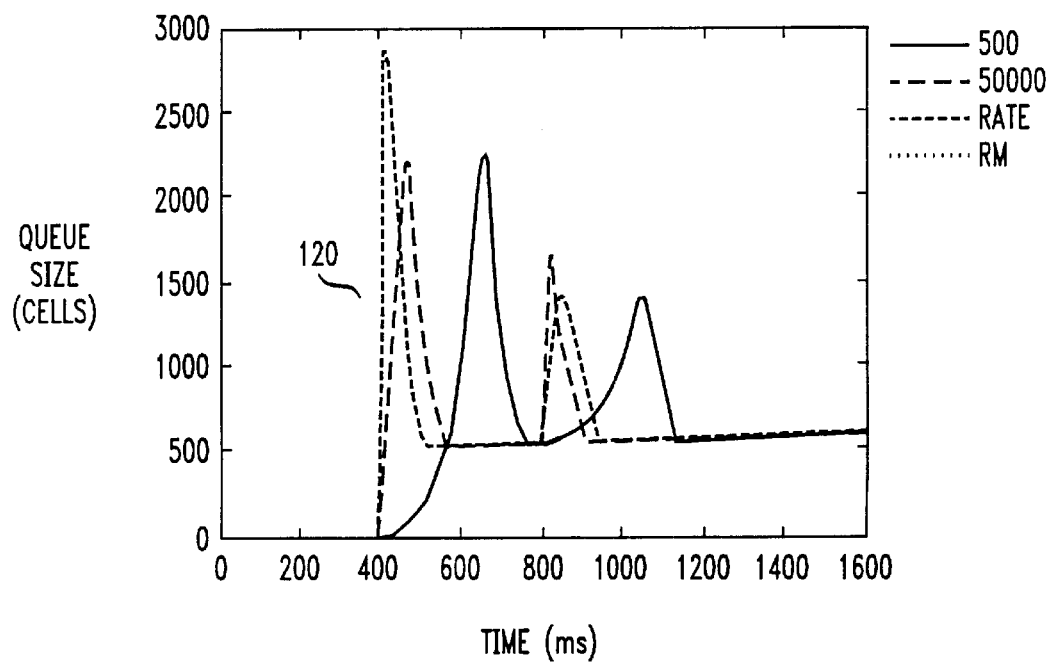
FIGS. 10(a) and 10(b) illustrate data for different reduced queue sizes under certain conditions.
Figure 10B:
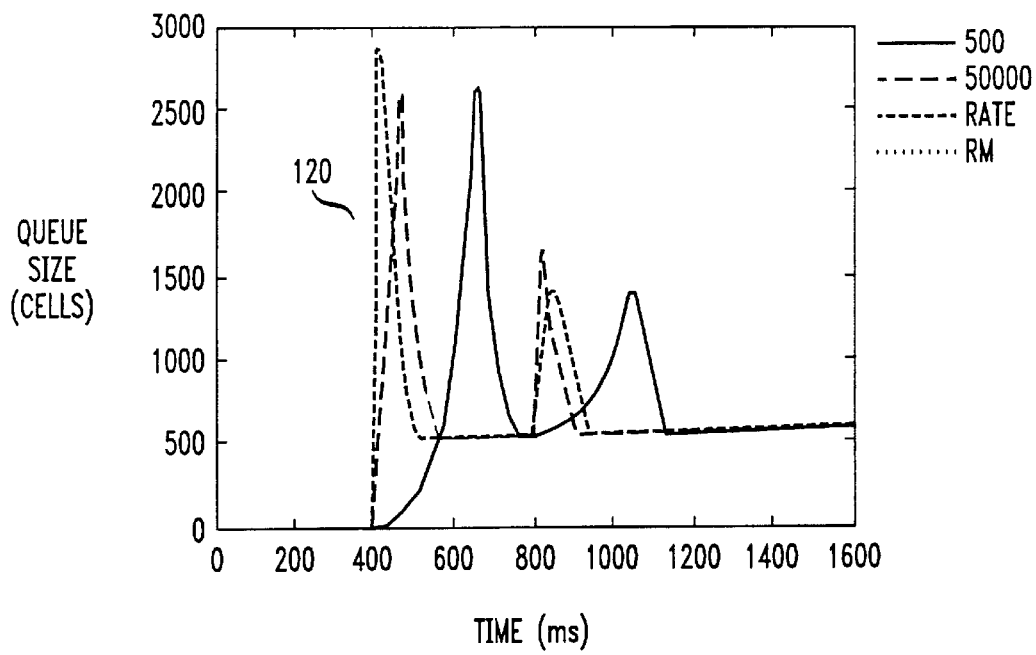

FIG. 10 shows the behavior of the queue at the 1st switch 20 in the topology shown in FIG. 2, when a long VC starts at time t=0, and two short VCs arrive at 400 and 800 milliseconds respectively (all with an RIF=1/512).

Both the RATE and RM options result in a queue buildup initially to 3000 cells, just as observed for this case without rate reduction. However, the invention is able to rapidly bring down the queue to the target setpoint of 600 cells in 5 to 6 round-trip times. There is no continuing buildup of the queue as observed in the cases without a queue reduction mechanism where the queue size built up to over 7000 cells even with just these 3 VCs (because of the arrival of the two short VCs). A smaller ICR results in a slightly smaller initial peak, of about 2400 cells. When the third VC comes on at 800 milliseconds, since there are more VCs now, there is a smaller queue buildup due to this incoming VC with all the options. The differences between the various options for the peak queue size is not as significant. The primary difference with a small ICR is the additional time it takes for the queue 120 to build up. It is observed that the difference in the queue behavior between FIFO queues and per-VC queues is not that substantial. There is a small additional queue with per-VC queues when the ICR is preset (50000 or 5000) compared to using FIFOs.

The behavior of the queue 120 with different values of RIF (going from 1/512 to 1/16) is also similar to what is observed in FIG. 10. The peak buildup is similar for larger values of RIF, even up to when it is 1, for a fixed ICR=500 cells/sec. and even with the RATE and RM options (which use an RIF=1, but may have a larger value of ICR). Having a small RIF (1/512) causes the queue to grow slower, and therefore gives the noted queue-reduction mechanisms time to act and bring down the queue 120.

Figure 11A:
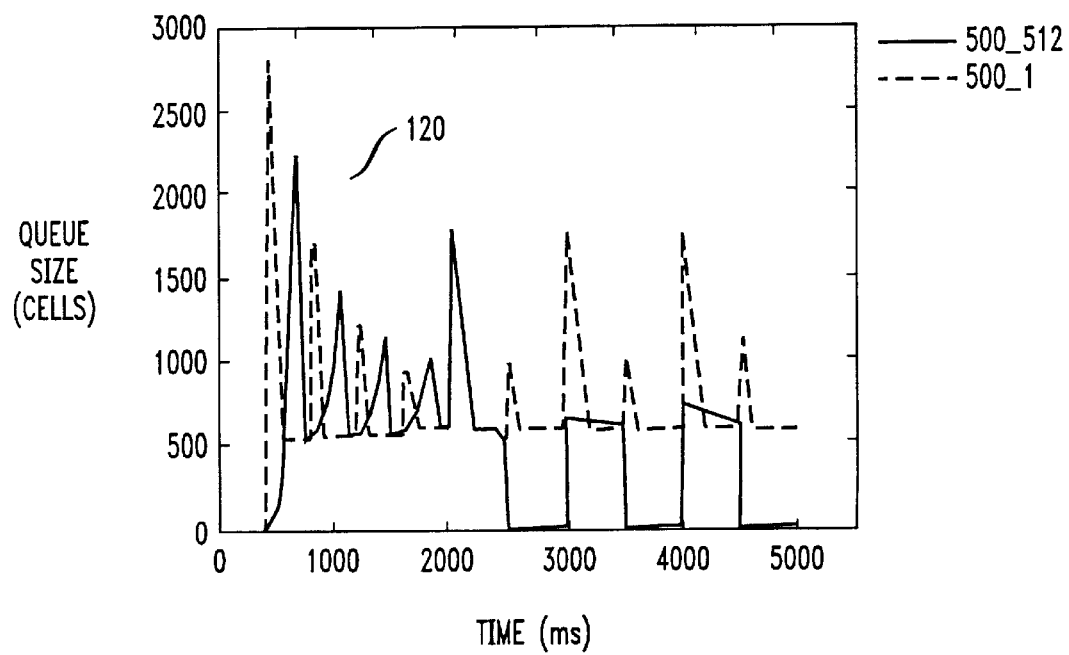
FIGS. 11(a) and 11(b) illustrate data for different reduced queues under certain other conditions.
Figure 11B:
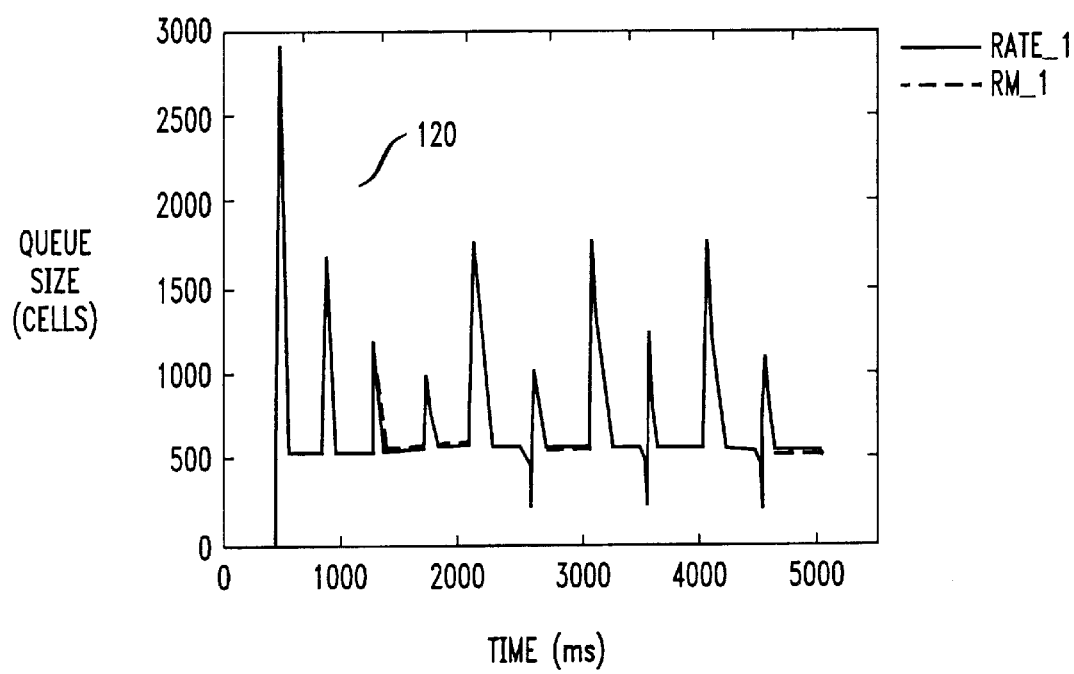
Figure 12A:
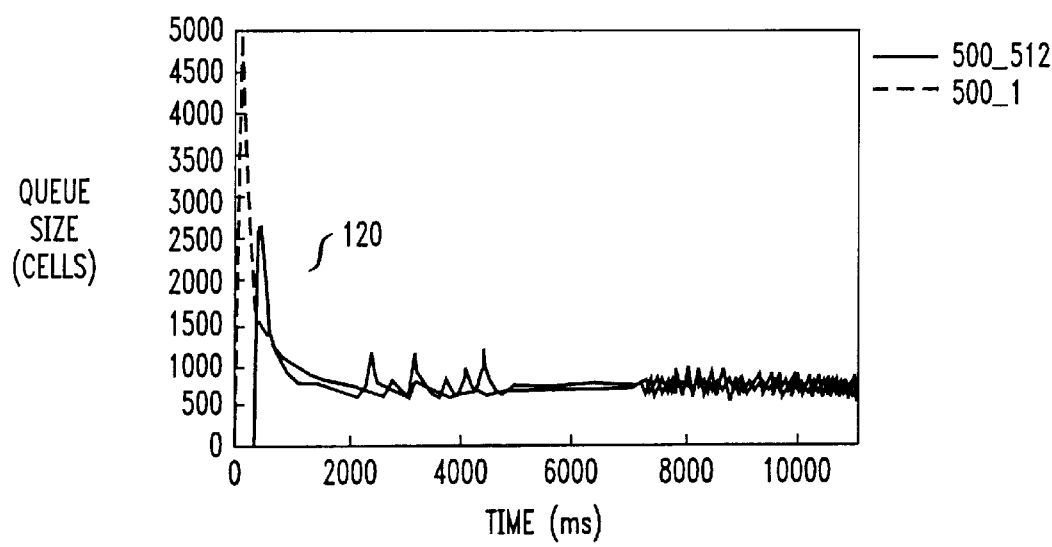
FIGS. 12(a), 12(b), 12(c) and 12(d) illustrate data for different reduced queues for 500 VCs.
Figure 12B:
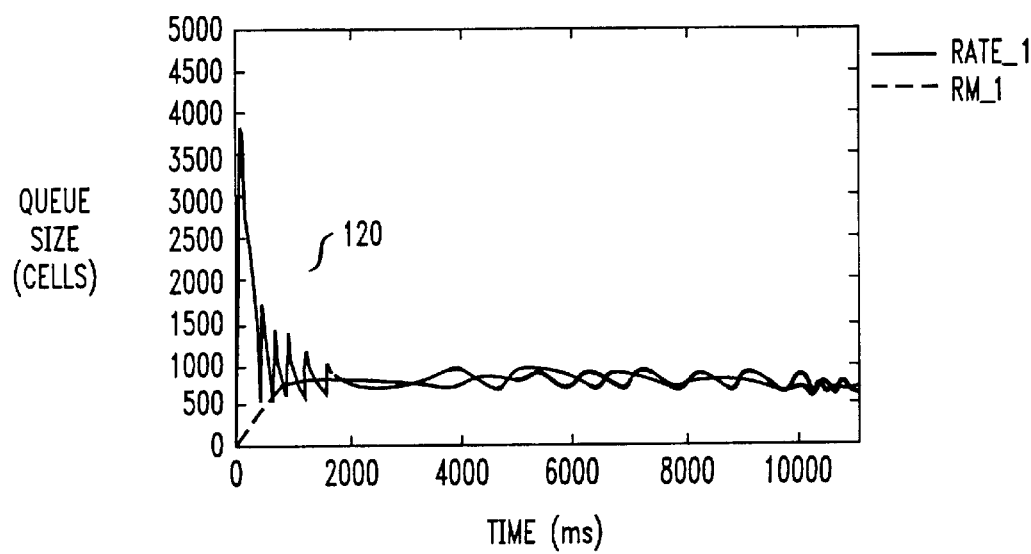
Figure 12C:
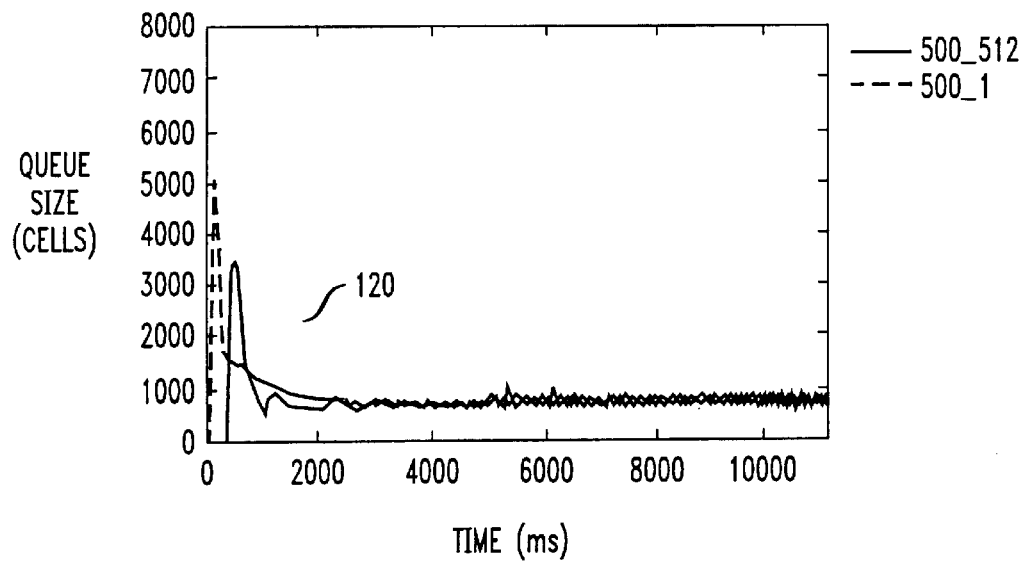
Figure 12D:
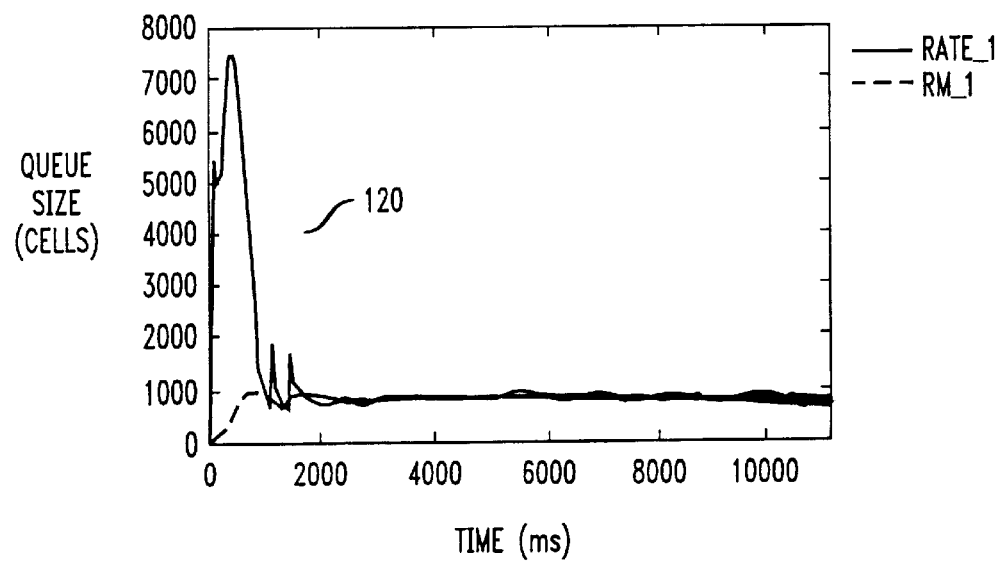
Figure 13:
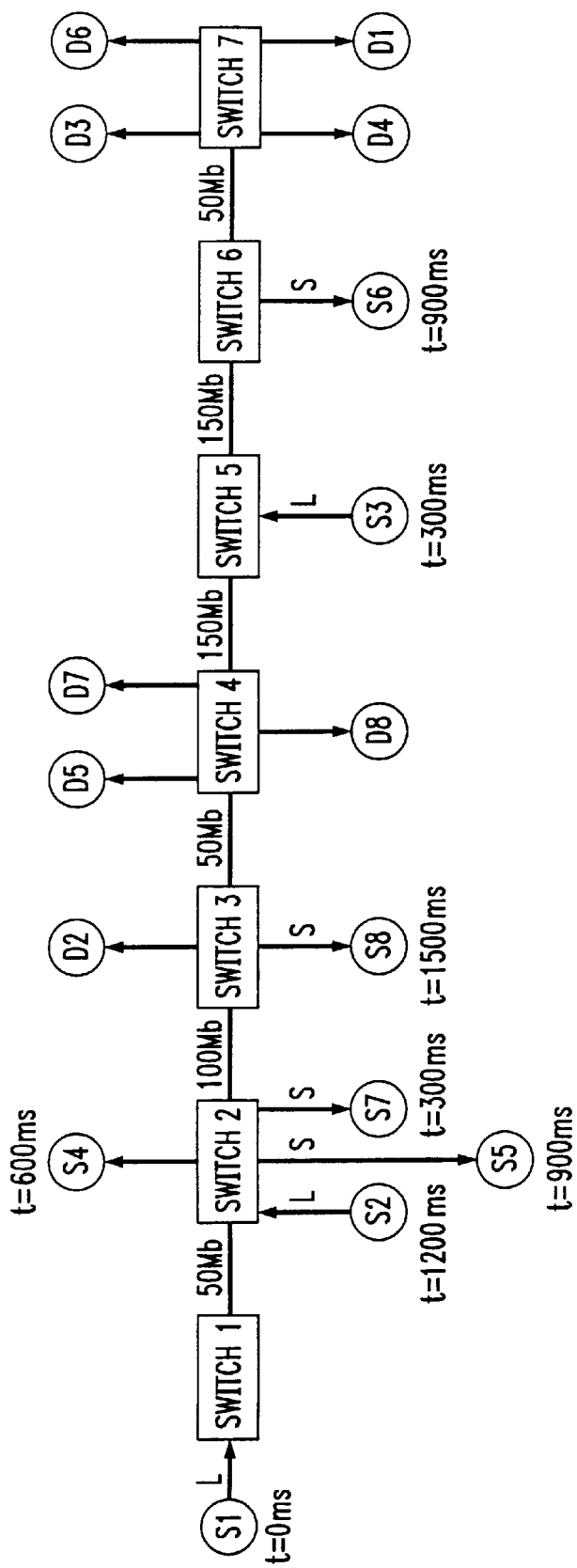
FIG. 13 illustrates a schematic block diagram for a GFC configuration of a network which may be managed according to the invention.

The inventors have examined the ability of the queue 120 to be controlled when the available bandwidth changes (e.g., reflecting a CBR VC going ON and OFF. When the CBR VC turns ON, the peak queue build up is about 1800 cells (3*S), considerably smaller than the nearly 170,000 cells observed without any queue reduction mechanism in place. The case with FIFO queues is shown in FIG. 11. When the CBR VC turns OFF, there is a potential for underutilization until the other VCs (especially those with a long RTT) ramp up their correct rates. Only the most conservative option of an ICR=500 and RIF=1/512 results in a small period over which the queue goes down to 0, for about 2 round-trip times.

Using the RATE and RM option of the invention do not result in any under-utilization because the queue size only drops down to about 250 cells. At this point, the rate of the ABR VCs catch up due to the large increase factor of 1. However, the large RIF does not hurt because the queue is brought down reasonably rapidly. With per-VC queues the only difference is with the RATE option where the queue drops down to nearly 0 for a brief period, less than a round trip time. Once the queue size is reduced, there is little difference between FIFO and per-VC queueing as far as the queue buildup is concerned.

To examine the ability of the queue management system. and method in which the invention operates to truly scale to vary large number of VCs, the inventors examined performance with 500 VCs. The difficulty with a large number of VCs is that the rate for an individual VC is so small that small perturbations to each source's rate beyond the max-min fair share results in considerable queueing. FIG. 8 illustrates that without a mechanism to reduce the queue 120, the queue build up is in fact substantial. There are 250 "long VCs" arriving initially, each staggered 20 milliseconds apart, and then there are another 250 "short VCs" that arrived subsequently, again spaced 20 milliseconds apart. The configuration used is the simple, two-switch topology shown in FIG. 2.

The behavior of the queue 120 using the queue control techniques to manage the queue is shown in FIG. 12. One of the explicit enhancements included for rate reduction as a result of the large-scale configuration was to recognize that the time between RM cells for an individual VC was larger than the round-trip time. Furthermore, the time estimate for the round-trip delay observed at connection setup, especially for per-VC queues is significantly smaller than when data is actually flowing. Furthermore, the slow recovery described above is highly desirable to ensure that the queue remains manageable. The best behavior is observed with the RM option, where the queue 120 remains close to the setpoint value of 600 cells under all circumstances. In fact, even the conventional option of having an ICR=500 cell/sec and RIF =1/512 shows good behavior (FIG. 12).

So far, discussion has focused on a relatively simple topology that emphasized the difference between the feedback delays for the sources 20. Here it is demonstrated that max-min fairness is maintained even in a more general topology, shown in FIG. 13, where there are multiple bottlenecks.

Figure 14:
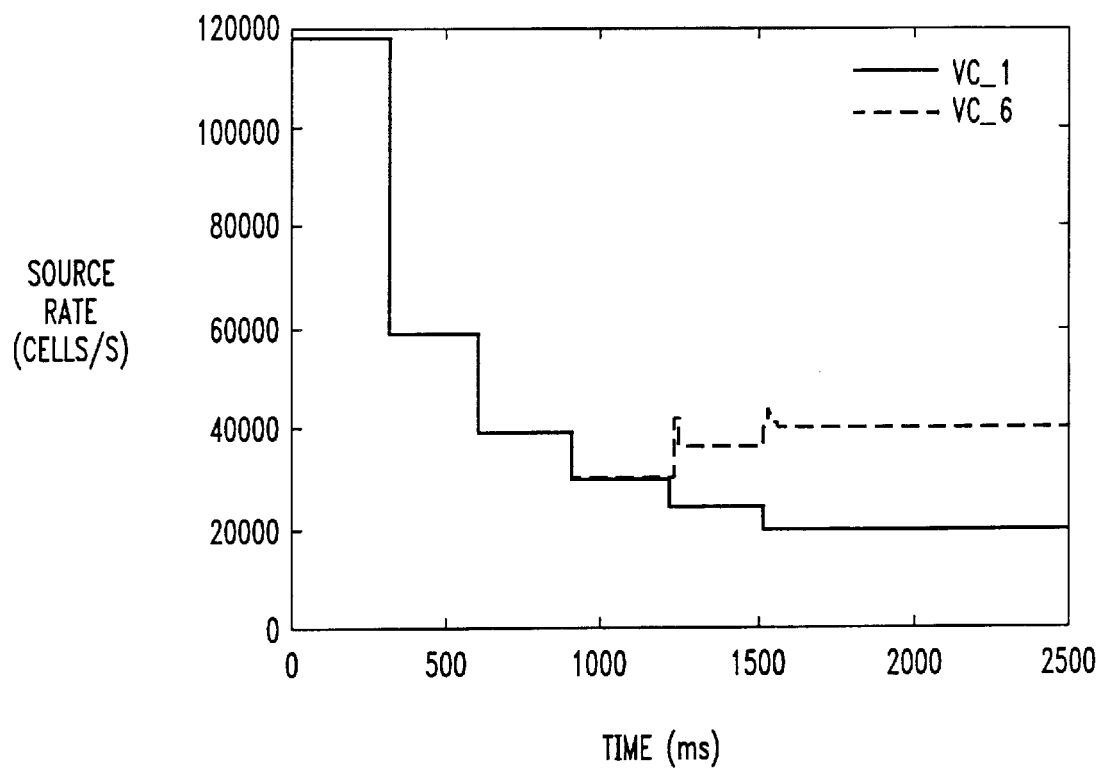
FIG. 14 illustrates data for reduced rates for two VCs.

As illustrated, there are 8 sources 20 that start up in a staggered manner (the start times for each of the sources is shown in the figure), and each source 20 goes through different sets of resources. The bandwidths of links 90 between the switches 20 are different (shown in the figure). The link bandwidth from the sources to the switches are all 155 Mbits/sec. There are 3 sources that have long feedback delays (the long links are marked "L"=8 milliseconds), and the other 5 sources have short feedback delays (marked "S"=0.5 $\mu$seconds). The target max-min rates for VC1 and VC6 are approximately 20K cells/sec. (8.333 Mbps) and 40K cells/sec. (16.667 Mbps) respectively. FIG. 14 shows the behavior of the source rates for VC 1 and 6. VC 1 starts at time t=0, and VC 6 starts at time t=900 milliseconds. It is observed that the sources 20 achieve their steady state max-min fair share rates subsequent to the last VC starting up (at time t=1500 milliseconds). Although there is a small reduction of the rates due to the queue buildup at both switch $20_3$ and switch $20_6$, the observation from the figure is that max-min fair rates are retained for the VCs throughout the process of different sources starting up (when the target fair rate for a VC changes).

In recapitulation, explicit rate mechanisms used for allocation of capacity of links 90 to sources 20 in an end-end rate based congestion control scheme have the desirable property of adjusting source rates to ensure feasibility. However, on a transient basis, the inventors have found that the rate is exceeded, causing queues 120 to buildup. When sources 20 place a persistent load and a rate allocation scheme attempts to fully allocate the available capacity, this queue 120 does not drain quickly, or naturally. Furthermore, even a small difference in the aggregate source rate above the capacity of link 90 can cause a quick, substantial buildup of the queue 120. This is especially true when the feedback delays to sources 20 are large and widely varying.

It is very desirable to allow sources 20 to opportunistically utilize available bandwidth, since once it is left unused for a moment in time, that opportunity is lost forever. This encourages sources 20 to start up aggressively and to ramp up their rate to the final value as fast as possible. All of these factors can result in large queues.

The inventors have showed that having a small ICR and/or small RIF does not always help in keeping the queues small. The queue buildup when the available capacity for ABR changes is also substantial. It has also been demonstrated that when we have a large number of VCs active (500 VCs), the queue buildup is clearly unreasonable (over a million cells). Also shown is that in some cases, the use of per-VC queues in fact results in a higher aggregate queue in comparison to FIFO queueing. With per-VC queues the inventors found that the delay to RM cells caused by future arrival of cells to another competing VC resulted in a higher queue, especially when the increase parameter, RIF was small. Thus, the inventors have determined that it is essential to have a startup management system and method, in the queue management and rate allocation mechanism environment in the switch 40.

The invention contemplates a system and method for managing the startup of source through switches 40, even under the most aggressive behavior patterns of the sources 20. The invention operates in the context of the Available Bit Rate (ABR) congestion scheme specified by the ATM Forum, with switches 40 using the explicit rate option (which the inventors believe has the most promise of maintaining rates close to the feasible value). The mechanisms of the invention are entirely compatible with the currently specified source and destination policies of the ABR specification. queue.

The invention takes advantage of the connection setup message to both compute a max-min fair rate for a VC, and allocate the rate to the incoming VC so that it serves as an early warning for existing VCs, in the RM option. Experiments showed that the startup management executed by the invention kept the resources close to the setpoint chosen (600 cells, or about 3IP packets of 9K), even when the source policy has the most aggressive behavior: the initial cell rate, ICR, is the final max-min fair share of the VC and the rate increase factor, RIF, is the maximum allowed, 1. Even when a higher priority CBR VC can take away half of the bandwidth of link 90, the queue buildup is not significant. In all of the cases, there is little or no underutilization of the bottleneck, which is desirable as well. To examine the ability of the queue reduction mechanism to scale up to large numbers of VCs, we showed that the performance is excellent even when we go up from a few (less than 10) VCs, up to 500 VCs, in a demanding configuration which has 4 orders of magnitude difference in feedback delays. Without the queue reduction mechanism, the queue buildup can in fact reach $10^6$ cells with 500 VCs. With the queue reduction techniques of the noted environment of the invention, the queue remains close to 600 cells.

Thus, the inventors have determined that it is highly desirable to have an effective startup management mechanism like that of the invention, in addition to a queue reduction and rate allocation mechanism in the switch 40 of network 100. When the startup management system and method of the invention is applied to explicit rate based networks, queues are reduced, startup times are enhanced, and allocative fairness is maintained.

All the disclosures cited above are incorporated in this application by reference, as fully as if reproduced herein. The foregoing description of the queue management system and method of the invention is illustrative, and additions and variations in construction and implementation will occur to persons selected in the art.

For instance, while the startup management system and method of the invention has been described as being implemented in the environment of an explicit rate-based ABR network also controlled by a certain queue reduction system, the startup management mechanisms of the invention could be applied to other network environments as well. A variety of rate reduction methods could be used in conjunction with the invention, too. Moreover, the RM option described above could be executed based on an ICR that the participating source uses: in this case, the computation and allocation (RM option) based on ICR is done when the connection setup is seen. The ICR in such a case is not necessarily negotiated between source and destination—it may instead be a conservative value picked by an individual source. Still, allocating the ICR upon connection setup helps provide an early warning, as noted above.

The scope of the invention is intended to be limited only by the following claims.

What is claimed is:

1. A startup management system for managing the startup of a source making a resource request through a communication link to a network, comprising:
    a network monitoring unit, for monitoring the available resources of the communication link; and
    a source rate adjustment unit, for adjusting the rate at which the source would begin to transmit over the communication link before the source queues data for transmission according to an allocative function of the available resources of the link which is determined based on a connection setup message, wherein source rate adjustment unit adjusts the rate allocated to the source by applying a max-min fairness criteria to the source, as the allocative function, and wherein the max-min fairness criteria is applied when a connection setup message arrives from the source.

2. A startup management system according to claim 1, wherein the source rate adjustment unit interprets the connection setup message as an resource management request.

3. A startup management system according to claim 2, wherein the connection setup message request is communicated to other sources connected to the communication link, to provide an early warning to the other sources of the entry of the source into the network.

4. A startup management system according to claim 3, wherein the source enters the network on an available bit rate basis.

5. A startup management system according to claim 2, wherein the source rate adjustment unit computes the adjusted rate, but delays allocation of that rate until arrival of an actual resource management request.

6. A startup management system according to claim 1, wherein the source rate adjustment unit computes the adjusted rate according to an initial cell rate value supplied from the source.

7. A method of managing the startup of a source making a resource request through a communication link to a network, comprising the steps of:
    monitoring the available resources of the communication link; and
    adjusting the rate at which the source would begin to transmit over the communication link before the source queues data for transmission according to an allocative function of the available resources of the link based on a connection setup message, wherein the step of adjusting comprises the step of adjusting the rate allocated to the source by applying a max-min fairness criteria to the source, as the allocative function, and wherein the step of applying max-min fairness criteria is performed when a connection setup message arrives from the source.

8. A method according to claim 7, further comprising the step of interpreting the connection setup message as an resource management request.

9. A method according to claim 8, further comprising the step of communicating the connection setup message request to other sources connected to the communication link, to provide an early warning to the other sources of the entry of the source into the network.

10. A method according to claim 9, wherein the source enters the network on an available bit rate basis.

11. A method according to claim 8, wherein the source rate adjustment step computes the adjusted rate, but delays allocation of that rate until arrival of an actual resource management request.

12. A method according to claim 7, wherein the source rate adjustment unit computes the adjusted rate according to an initial cell rate value supplied from the source.

* * * * *